(12) United States Patent
Okabe et al.

(10) Patent No.: US 7,397,975 B2
(45) Date of Patent: Jul. 8, 2008

(54) OPTICAL SWITCH

(75) Inventors: Ryou Okabe, Kawasaki (JP); Shigeki Watanabe, Kawasaki (JP); Fumio Futami, Kawasaki (JP); Shunsuke Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/627,423

(22) Filed: Jan. 26, 2007

(65) Prior Publication Data

US 2007/0292070 A1    Dec. 20, 2007

(30) Foreign Application Priority Data

Jun. 14, 2006  (JP)  ............................. 2006-164815

(51) Int. Cl.
*G02F 1/295* (2006.01)
*G02B 6/24* (2006.01)
*G02B 6/00* (2006.01)

(52) U.S. Cl. ................................ 385/11; 385/5; 385/27; 385/122

(58) Field of Classification Search ..................... 385/11
See application file for complete search history.

(56) References Cited

U.S. PATENT DOCUMENTS

| | | | | |
|---|---|---|---|---|
| 5,206,922 | A | * | 4/1993 | Westland et al. ............... 385/5 |
| 6,920,263 | B2 | * | 7/2005 | Tadakuma et al. ............ 385/27 |
| 2006/0045445 | A1 | * | 3/2006 | Watanabe ................... 385/122 |

FOREIGN PATENT DOCUMENTS

| | | |
|---|---|---|
| JP | 05-289124 | 11/1993 |
| JP | 11-238941 | 8/1999 |

OTHER PUBLICATIONS

L.F. Mollenauer et al., "Method for facile and accurate measurement of optical fiber dispersion maps", OFC '97 Technical Digest, 1997, pp. 255-256.

(Continued)

*Primary Examiner*—Hemang Sanghavi
(74) *Attorney, Agent, or Firm*—Staas & Halsey LLP

(57) ABSTRACT

Reflection means such as a mirror are provided on the output end of an optical fiber, and the input signal light and control light are returned to the optical fiber. Although the zero-dispersion wavelength of the optical fiber fluctuates in the longitudinal direction, if the length is relatively short, it is possible to manufacture a high yield of optical fibers, which monotonically changes the zero-dispersion wavelength. Therefore, a relatively short optical fiber with a monotonic zero-dispersion change can be used. Since the zero-dispersion change is monotonic and the optical fiber is short, the amount of change in the zero-dispersion wavelength is small and the bandwidth becomes broader when the control light is set at the position of the average zero-dispersion wavelength. Additionally, although the length of the optical fiber is short, the operating length is twice as long and thus the generation efficiency does not degrade.

10 Claims, 7 Drawing Sheets

OTHER PUBLICATIONS

Masaaki Hirano et al., "Broadband Wavelength Conversion over 193-nm by HNL-DSF Improving Higher-order Dispersion Performance", OFC 2005 Post deadline session 4, 2005.

C. Yu et al., "Polarization-Insensitive Four-Wave Mixing Wavelength Conversion Using a Fiber Bragg Grating and a Faraday Rotator Mirror", OFC Postconference Digest, Mar. 23, 2003, pp. 347-349.

S. Watanabe et al., "Novel Fiber Kerr-Switch with Parametric Gain: Demonstration of Optical Demultiplexing and Sampling up to 640 Gb/s", Proceedings of the European Conference on Optical Communication, 2004, pp. 12-13.

S. Watanabe et al., "Optical Signal Processing Using Nonlinear Fibers", European Conference on Optical Communication, Sep. 11, 2002, 2 pages.

Extended European Search Report issued in corresponding European Patent Application No. 07001490.7, on Oct. 8, 2007.

* cited by examiner

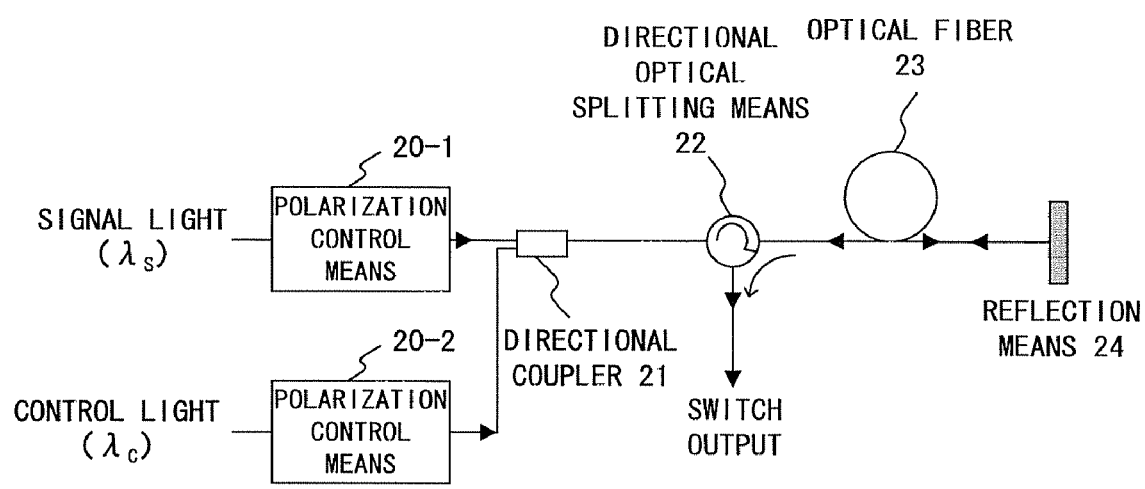
F I G. 4

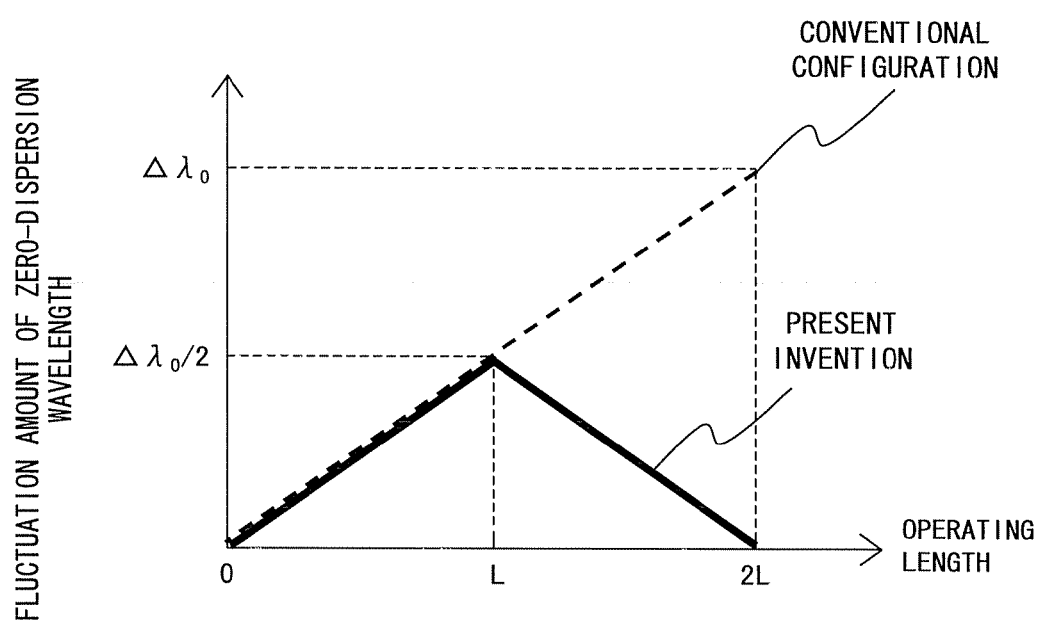
F I G. 5

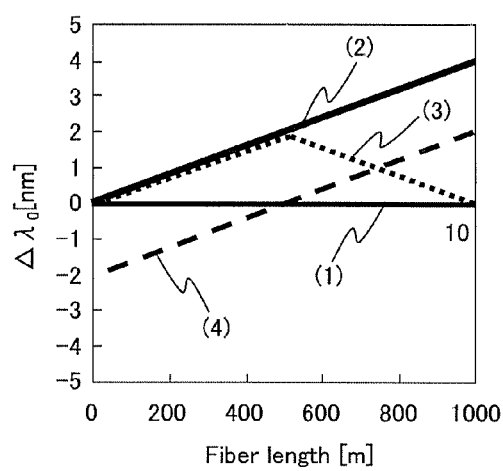 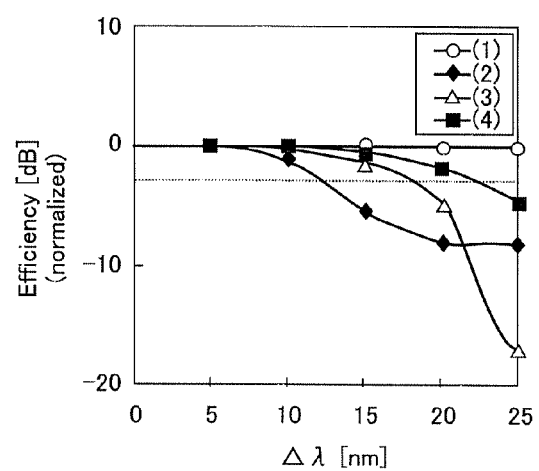
F I G. 6A    F I G. 6B

OPTICAL SWITCH

BACKGROUND OF THE INVENTION

1. Field of the Invention

The present invention relates to an optical switch.

2. Description of the Related Art

With recent increases in the capacity of optical fiber communications, the bit rate of these communications has reached 160 Gb/s or higher and an optical switch that can adopt such speeds has been sought in research aiming at the next generation system. Among optical switches that are operated at ultra-high speed there exists an optical fiber switch employing an all-optical processing technique that controls light via another light and that utilizes a nonlinear optical effect in an optical fiber. Optical switches employing a highly nonlinear fiber, in particular, generally have characteristics of high switching efficiency and low loss.

One of the nonlinear optical effects applied to such an optical fiber switch is a phenomena referred to as four-wave mixing. Four-wave mixing is a phenomena in which third light (idler light) is generated when control light ($\lambda_C$) having the same wavelength as the zero-dispersion wavelength ($\lambda_O$) of the optical fiber and signal light of a wavelength different from the wavelength of the control light are input into an optical fiber. When that happens, gain of power is generated in the signal light like in the idler light. This is referred to as parametric gain.

FIG. 1 is a diagram showing an example of the typical configuration of the optical fiber switch utilizing four-wave mixing.

This configuration causes the polarization state of signal light with wavelength $\lambda_S$ and the control light with wavelength $\lambda_C$ to be parallel with each other using polarization controllers 10-1 and 10-2, respectively, multiplexing the lights using a directional coupler 11 such as an optical coupler, and inputting the light into an optical fiber 12 of a zero-dispersion wavelength $\lambda_O$.

In order to generate four-wave mixing efficiently, a phase matching condition of the signal light and the control light must be satisfied along through the highly nonlinear fiber. The phase matching condition is a condition in which the amount of phase mismatching $\Delta\beta$ of the signal light and the control light is 0, as shown in equation (1). Here, dD/dλ denotes the dispersion slope of the optical fiber [ps/nm$^2$/km], c denotes the speed of light [m/s], and π denotes the ratio of the circumference of a circuit to its diameter.

$$\Delta\beta = -\frac{2\pi c}{\lambda_0}\frac{dD}{d\lambda}(\lambda_c - \lambda_0)(\lambda_c - \lambda_s)^2 \qquad \text{Equation (1)}$$

As is clear from equation (1), if the wavelength of the control light $\lambda_C$ and the zero-dispersion wavelength $\lambda_O$ of the optical fiber are the same, the amount of phase mismatch $\Delta\beta$ is 0. Accordingly, if the wavelength of the control light $\lambda_C$ and the zero-dispersion wavelength $\lambda_O$ of the optical fiber are the same at any place over the length of the optical fiber in the longitudinal direction, the highest efficiency four-wave mixing can be generated.

The definitions of generation efficiency η and the bandwidth of four-wave mixing are given next. The four-wave mixing efficiency η is defined as $P_I/P_S$, which is the ratio of the idler light optical power ($P_I$) at the optical fiber output end to the signal light optical power ($P_S$) at the input end of the optical fiber. The efficiency is, as shown in equation (2), a value proportional to the squared product of a nonlinear coefficient of an optical fiber $\gamma[W^{-1}\ km^{-1}]$, a length of the optical fiber L[km], and the peak power of the control light ($P_C$).

$$\eta \propto (\gamma P_C L)^2 \qquad \text{Equation (2)}$$

Here, the bandwidth of four-wave mixing is defined as the bandwidth of the signal light where the maximum generation efficiency is reduced by half (reduced by 3 dB) by measuring the generation efficiency of four-wave mixing when the wavelength of the signal light ($\lambda_S$) is shorter than that of the control light ($\lambda_C$) ($\lambda_S<\lambda_C$), and when the wavelength of the signal light ($\lambda_S$) is longer than that of the control light ($\lambda_C$) ($\lambda_S>\lambda_C$).

When four-wave mixing is utilized in an optical switch, it is desirable to have a high generation efficiency and to operate over a broad bandwidth. If the phase mismatch $\Delta\beta$ is 0 at any place, the phase matching condition is satisfied in any wavelength of the signal light, and the operation bandwidth increases to infinity. In order to satisfy the phase matching condition, the dispersion slope of the optical fiber has to be 0 at any place, or the wavelength of the control light ($\lambda_C$) and the zero-dispersion wavelength ($\lambda_O$) of the optical fiber have to match completely. It is clear from equation (2) that the generation of high-efficiency four-wave mixing requires an increase in the nonlinear coefficient, enhancement of the peak power of the control light, and an increase in the length of the optical fiber. These characteristics are the same for the parametric gain to the signal light.

However, it is difficult to obtain a dispersion slope of exactly 0 in actual optical fibers, and the zero-dispersion wavelength fluctuates along the length of the optical fibers in the longitudinal direction. For example, the measurement result of the zero-dispersion wavelength in the longitudinal direction of an optical fiber is reported in Non-patent Document 1, and that of the highly nonlinear fiber is reported in Non-patent Document 2.

FIG. 2 is a diagram showing the distribution of the zero-dispersion wavelength measured along the length of the highly nonlinear fiber in the longitudinal direction, reported in Non-patent Document 2.

Fiber-A and Fiber-B in FIG. 2 are samples of highly nonlinear fibers having different nonlinear coefficients. It is reported that both fibers have zero-dispersion wavelengths that fluctuate by approximately 2 nm in 2 km of an optical fiber. Although explained later, the fluctuation state of the zero-dispersion wavelength is first described here. "Sample" in FIG. 2 indicates a 100 m sample cut out from the whole. From FIG. 2, many samples which have a zero-dispersion wavelength that monotonically increases (or monotonically decreases) in the longitudinal direction can be cut out by limiting their length to several hundred meters.

As explained above, in conventional optical fibers the phase matching condition cannot be satisfied completely because the zero-dispersion wavelength fluctuates in the longitudinal direction, and this is one of the factors that limit the generation efficiency and bandwidth of four-wave mixing.

Conventional optical devices employing four-wave mixing are described in Patent Documents 1 and 2, and these documents disclose a technology for reducing the polarization dependency of optical devices which utilize four-wave mixing.

[Non-patent Document 1]

L. F. Mollenauer, et al., Tech. Digest, OFC' 97 pp. 255-256

[Non-patent Document 2]

Hirano et al., OFC 2005 Post deadline session 4

[Patent Document 1]
Japanese Patent Application Publication No. 05-289124

[Patent Document 2]
Japanese Patent Application Publication No. 11-238941

In order to solve the above issue, the conventional method reduces the fluctuation range of the zero-dispersion wavelength by shortening the length of the highly linear fiber to obtain a wider operation band bandwidth; however, this causes a problem in which the generation efficiency is lowered. On the other hand, if the length L of the optical fiber is extended in order to enhance the efficiency, a problem occurs in which the bandwidth becomes narrow and the bandwidth and the efficiency therefore enter a trade-off relation, as shown in FIG. 7.

FIG. 3 is a diagram showing the concept of the trade-off relation between the bandwidth and the efficiency.

As shown in FIG. 3, when a comparison is made under the same power conditions, if the length L of an optical fiber is short, as indicated by the dotted line, the efficiency η is low but has a wide bandwidth. In addition, if the length L of the optical fiber is long, as shown by the solid line, the bandwidth becomes narrow but has a high efficiency η.

SUMMARY OF THE INVENTION

It is an object of the present invention to provide an optical fiber switch comprising a configuration for a wide-bandwidth operating band without reducing the generation efficiency of four-wave mixing (parametric gain).

The optical switch of the present invention comprises a first polarization control means for controlling the polarization state of signal light, a second polarization control means for controlling the polarization state of control light, multiplexing means for multiplexing outputs of the first and the second polarization control means, a nonlinear medium for receiving the output of the multiplexing means and for generating four-wave mixing, reflection means for reflecting the output of the nonlinear medium and inputting it once again into the nonlinear medium, splitting means for splitting the signal light and the control light after they pass through the nonlinear medium reflected by the reflection means from the signal light and the control light that were output from the multiplexing means, and extraction means for extracting the signal light from the light mixed with the signal light and the control light that were output from the splitting means.

According to the present invention, it is possible to provide an optical fiber switch for a wide-bandwidth operating band without reducing the generation efficiency of four-wave mixing (parametric gain). The length of the optical fiber required for the optical fiber switch can be shorter than the conventional configuration, which would have the effect of improving the yield of the optical fibers that can be used for optical switches.

BRIEF DESCRIPTION OF THE DRAWINGS

FIG. 4 is a diagram showing the basic configuration of the embodiment of the present invention;

FIG. 5 is a diagram explaining the effect obtained by the configuration of the present invention;

FIGS. 6A and 6B are diagrams explaining the effect of the reduction in the amount of fluctuation of the zero-dispersion wavelength on the four-wave mixing bandwidth.

DESCRIPTION OF THE PREFERRED EMBODIMENTS

Figure 1:
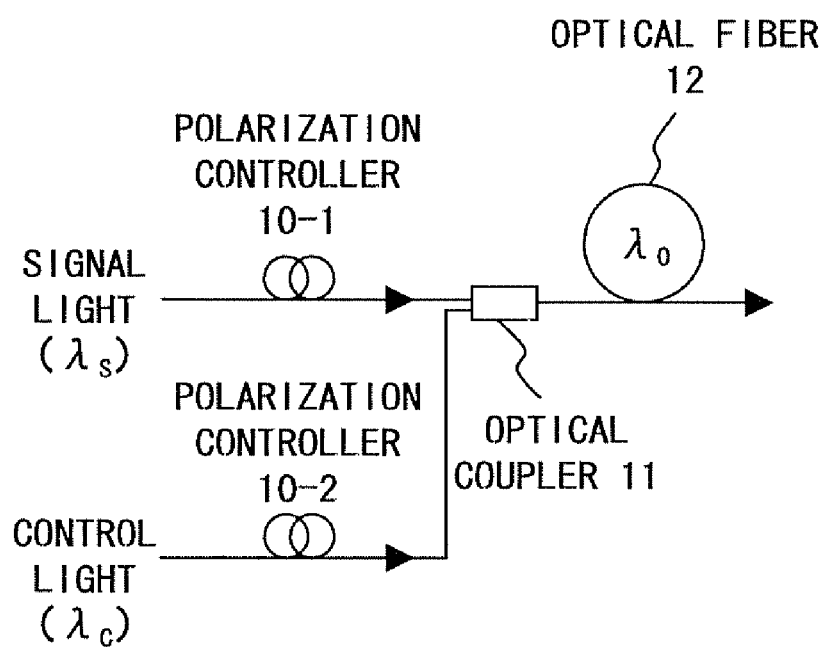
FIG. 1 is a diagram showing an example of the typical configuration of an optical fiber switch employing four-wave mixing.

FIG. 4 is a diagram showing the basic configuration of the embodiment of the present invention.

In FIG. 4, polarization states of signal light (wavelength: $\lambda_S$) and control light (wavelength: $\lambda_C$) are controlled by polarization control means 20-1 and 20-2, respectively, and are multiplexed by a directional coupler 21 such as an optical coupler. Each of the multiplexed lights passes through directional optical split means 22 such as an optical circulator and is input into an optical fiber 23. Reflection means 24 such as a mirror are provided on the output end of the optical fiber, reflecting the signal light and the control light, and the reflected light is once again input into the optical fiber 23. The signal light and the control light are extracted by the directional optical split means.

By employing such a configuration, if the length of the optical fiber is L, the operating length becomes 2 L, which is twice as long because of the reflection. However, as described above, since the zero-dispersion wavelength fluctuation is present in the longitudinal direction of an actual optical fiber, different effects can be obtained when the length is 2 L in the conventional configuration (see FIG. 5) and when the length is L and the operating length is 2 L in the configuration of the present invention. The effects are explained with reference to FIG. 5.

FIG. 5 is a diagram explaining the effect obtained by the configuration of the present invention.

Figure 2:
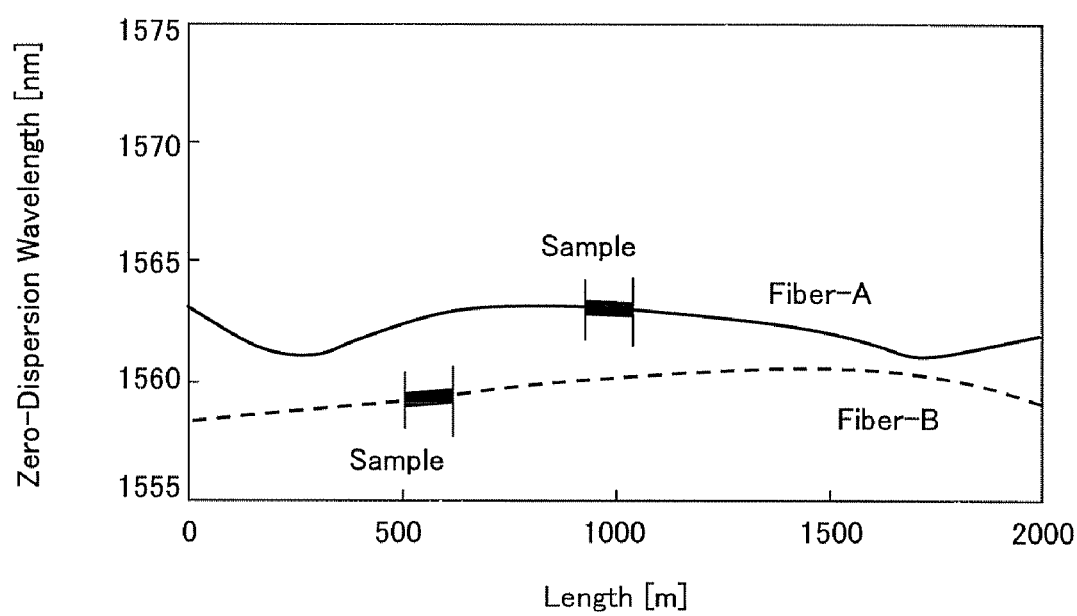
FIG. 2 is a diagram showing the distribution of the zero-dispersion wavelength measured along the length of the highly nonlinear fiber in the longitudinal direction.
Figure 3:
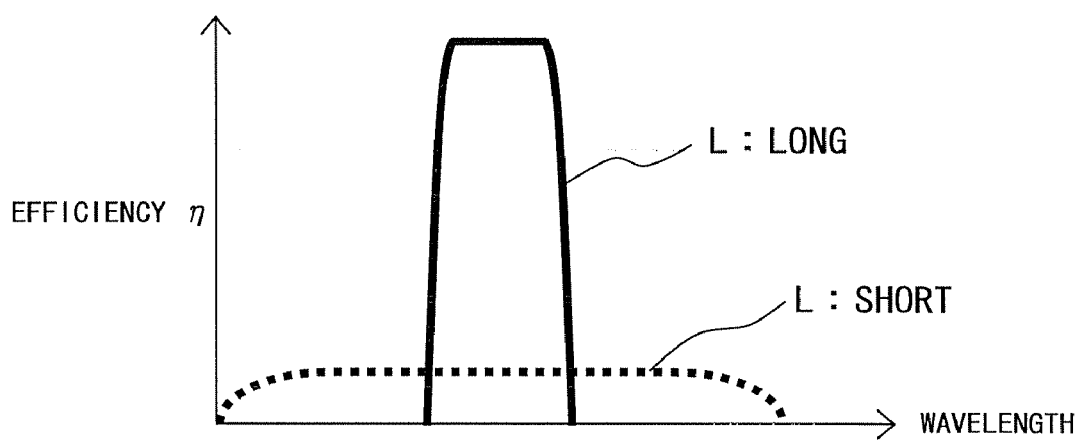
FIG. 3 is a diagram showing the concept of the trade-off relation between the bandwidth and the efficiency.

In FIG. 5, operating length is on the horizontal axis and the amount of fluctuation of the zero-dispersion wavelength is on the vertical axis. In the conventional configuration, the operating length and the length of the optical fiber are both 2 L, whereas in the present invention, the length of the optical fiber is L while the operating length is 2 L that is the same as the conventional configuration. As explained with reference to FIG. 2, if the length is several hundredmeters, it is possible to simulate the monotonical increase (or monotonical decrease) of a fiber with a zero-dispersion wavelength. In the following description, an optical fiber with a zero-dispersion wavelength monotonically increasing in the longitudinal direction is simulated. Both have the same operating length of 2 L. However, while the amount of fluctuation of the zero-dispersion wavelength is $\Delta\lambda_O$ in the conventional configuration, the length of the optical fiber becomes ½ when employing the configuration of the embodiment of the present invention, and it is possible to reduce the amount of fluctuation by half to $\Delta\lambda_O/2$. The amount of fluctuation of the zero-dispersion wavelength is determined by the physical length rather than by the operating length of the fiber. In other words, if the light is reflected after traveling the length of L and returns, since the physical length of the fiber is L, the amount of fluctuation $\Delta\lambda_O$ is smaller here than it is for 2 L. Ultimately, the operating length becomes 2 L when the light is reflected and returns to the point at which L=0; however since the physical length is L, the amount of fluctuation remains small.

FIGS. 6A and 6B are diagrams explaining the effect on the four-wave mixing bandwidth of the reduction in the amount of fluctuation of the zero-dispersion wavelength.

FIG. 6A shows a fluctuation model of the zero-dispersion wavelength used in the numeric calculation simulation and FIG. 6B shows the result of the bandwidth simulation via numeric calculation simulation. The numeric calculation simulation is based on the following equation (3), which expresses details of equation (2).

[Equation 3]

$$\eta = \left[\gamma P_c L \frac{\sinh(gL)}{gL}\right]^2 \quad \text{Equation (3)}$$

Equation (3) involves the assumptions that the power of the control light does not attenuate and that the power of the control light is sufficiently greater than the power of the signal light. Equation (3) is correlated with equation (1), indicating the amount of phase mismatching $\Delta\beta$ with the following equation, equation (4).

[Equation 4]

$$g^2 = \Delta\beta\left(\frac{\Delta\beta}{4} + \gamma P_c\right) \quad \text{Equation (4)}$$

Equation (4) gives the interrelation (calculation result) between $\Delta\lambda$ and the four-wave mixing efficiency, which is shown in FIG. 6B. The vertical axis of FIG. 6B indicates the four-wave mixing efficiency normalized by the maximum value, and $\Delta\lambda$ on the horizontal axis represents the wavelength difference (the amount of detuning) of the control light and the signal light. In the following, a case in which the signal light wavelength $\lambda_S$ is shorter than the control light wavelength $\lambda_C$ in the predefined four-wave mixing bandwidth is described. The model of the numeric calculation simulation is assumed to have a fiber length of 1000 m, and the control light is set to have a wavelength $\lambda_C$ where $\lambda_C = \lambda_O$ when the amount of fluctuation of the zero-dispersion wavelength $\Delta\lambda_O$ is 0. Each of the simulation conditions is explained. (1) is the case when $\Delta\lambda_O = 0$ nm, (2) is the case when $\Delta\lambda_O = 4$ nm (an example of the conventional configuration), (3) is the case when $\Delta\lambda_O = 2$ nm (an example of the present invention), and (4) is the case when $\Delta\lambda_O = 4$ nm (a case in which $\lambda_C$ is set to the average zero-dispersion value in the conventional configuration). Since condition (1) is an ideal optical fiber with a zero-dispersion fluctuation of 0, as explained in equation (1), the phase matching condition is completely satisfied and the bandwidth is infinite with no degradation. On the other hand, in the conventional configuration, condition (2), the efficiency is reduced by half and $\Delta\lambda$ is 12 nm as obtained through numeric calculation simulation, whereas in the numeric simulation result of the configuration according to the present invention, condition (3), the efficiency is reduced by half, $\Delta\lambda$ is 19 nm, and the bandwidth is expanded. Additionally, although condition (4) is a simulation result when the control light is set to the average zero-dispersion wavelength, condition (4) has a wider bandwidth than condition (3). This is because, under the present simulation conditions, the control light and the signal light propagate in the optical fiber when the phase mismatching is minimized over the entire length of the optical fiber. Thus, in order to generate the maximum bandwidth with the configuration of the present invention under condition (3), the control light should be set so as to satisfy condition (4), that is, it should be set to the average zero-dispersion wavelength.

In the above description, the effect of the bandwidth of four-wave mixing expanding as the amount of fluctuation of the zero-dispersion wavelength decreases is explained. In the following, the shortcomings of the configuration of the present invention are examined via a comparison between the conventional configuration and the configuration of the present invention. The present invention, in contrast to the conventional configuration, could have an optical isolator, an optical circulator, and a mirror installed, thereby increasing in the insertion loss. The total insertion loss of these optical elements that are commonly sold on the market, according to a catalog from the General Photonics Corporation (http://www.generalphotonics.com/), can be approximated as 2 dB. The generation efficiency of four-wave mixing is, as explained with equation (2), proportional to the squared length of the optical fiber. In other words, given that the four-wave mixing efficiency when using the optical fiber length L in the conventional configuration is $\eta$, the efficiency improves four-fold when the fiber length is L in the configuration of the present invention since the operating length doubles. Utilizing this improved efficiency, the above four-fold improvement in generation efficiency can be achieved with an optical fiber length of 0.65 L (which is 35% shorter than the length in the conventional configuration) when generating the generation efficiency $\eta$ (which is the same as that of the conventional configuration) in the configuration of the present invention, in addition to the compensation for the above insertion loss. In the manner described above, the problem of the insertion loss can be overcome and the present invention can have a wide bandwidth without a reduction in the generation efficiency.

Figure 7:
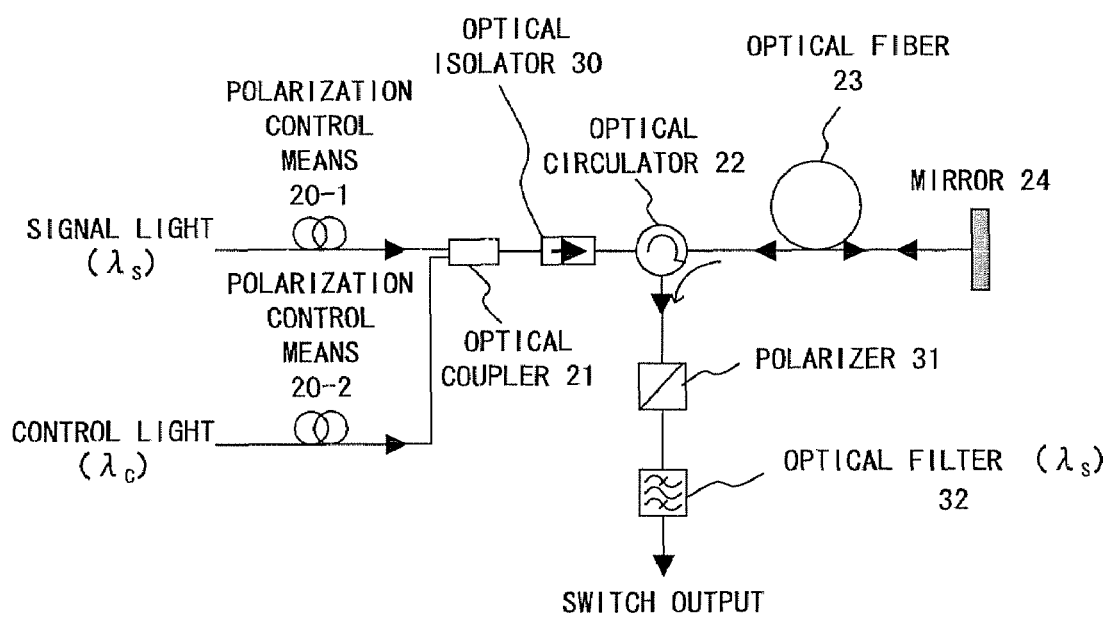
FIG. 7 is a diagram showing an example of a configuration of an optical fiber switch employing the basic configuration of the present invention.

FIG. 7 is a diagram showing an example of a configuration of an optical fiber switch employing the basic configuration of the present invention.

It should be noted that in FIG. 7, the components corresponding to those in FIG. 4 are assigned the corresponding numerical reference and the explanations of those components are omitted.

FIG. 7 is an example of a configuration of the optical fiber switch for extracting only a signal light component with optical parametric gain from the switching output in the basic configuration of the present invention explained in FIG. 4 by providing a polarizer 31 and an optical filter 32. The optical parametric gain is an effect in which gain is generated in the signal light by four-wave mixing. When applying the basic configuration of the present invention to an optical fiber switch, the signal light and the control light may be continuous wave light or optical pulses. When both the signal light and the control light are optical pulses and switching is performed by the control light pulse synchronized with the time-division multiplexed signal light, adjustment is required so that the timing of the signal light pulse and the control light pulse overlap with each other in terms of time. In order to make such an adjustment, an optical delay line is provided to the input of either the signal light or the control light, and the delay time of either the signal light pulse or the control light pulse should be adjusted. Additionally, the delay line does not have to be provided when using the present optical switch for optical sampling etc. when it is used with an intentionally changed signal light pulse and control light pulse repetition frequency. Note that it is possible for the optical coupler 21 multiplexing the signal light and the control light to be a WDM coupler, which would enable the signals to be multiplexed with the signal light wavelength and the control light wavelength. The polarization states of the signal light and the control light should be set as below. In the state in which the control light has not been input into the optical switch, the setting is such that signal light is input into the optical switch and a transmitted component is shielded at the output end of the polarizer 31. In other words, the polarization state of the signal light is set to be orthogonal with respect to the transmission axis direction of the polarizer 31. Next, the polarization state of the control light is set at 45 degrees with respect to the signal light, and it is input into the optical fiber. In a configuration in which the polarization state of the control light is maintained from the light source to the optical fiber and is input into the optical fiber in an optimal state, the polarization controller (20-2) is not necessarily required. In this situation, the signal light, by obtaining an effect in which the polarization state rotates due to the effects of the cross-phase modulation in the optical fiber and the parametric gain resulting from four-wave mixing, has a plane of polarization in approximately the same state as that of the control light, and the component in the transmission axis direction of the polarizer 31 passes through the polarizer 31 (when an input is made at an angle of approximately 45 degrees, the output power from the polarizer is maximized). The wavelength of the control light in this situation should be set so as to match the average zero-dispersion wavelength of the optical fiber. The optical fiber can be either a dispersion shift fiber (DSF), a highly nonlinear fiber, or a photonic crystal fiber (PCF). The mirror used in this situation may be a mirror with 100% reflection or a Faraday rotator mirror, which causes reflection while rotating the polarization state by 90 degrees. In such a manner, the component of the signal light passing through the polarizer 31 is extracted by the optical filter 32. The optical filter 32 may be a band rejection filter for shielding the wavelength ($\lambda_C$) of the control light or a band pass filter for passing only the wavelength of the signal light ($\lambda_S$), or a WDM coupler, which enables the signals of the signal light wavelength and the control light wavelength to be split with low losses.

It should be noted that the optical isolator 30 is for preventing the light reflected by the mirror 24 from leaking to the input side of the signal light and the control light.

What is claimed is:

1. An optical switch, comprising:
    a first polarization control unit for controlling a polarization state of signal light;
    a multiplexing unit multiplexing control light and an output light from the first polarization control unit to produce multiplexed light;
    a nonlinear medium receiving the multiplexed light from the multiplexing unit and generating four-wave mixing;
    a reflection unit reflecting the multiplexed light which passes through the nonlinear medium; and
    a splitting unit separating the output light and the control light, both of which are reflected by the reflecting unit.

2. The apparatus according to claim 1, further comprising an extraction unit extracting the output light from the multiplexed light which is mixture of the output light and the control light.

3. The apparatus according to claim 1, wherein the multiplexing unit is an optical coupler.

4. The apparatus-according to claim 1, wherein the nonlinear medium is a highly nonlinear optical fiber.

5. The apparatus according to claim 1, wherein the reflection unit is a mirror.

6. The apparatus according to claim 1, wherein the splitting unit is an optical circulator.

7. The apparatus according to claim 1, wherein the extraction unit comprises:
    a polarizer; and
    an optical filter for extracting light with a wavelength matching the output light.

8. The apparatus according to claim 7, wherein the polarizer does not pass the output light when the control light is not input into the apparatus.

9. The apparatus according to claim 8, further comprising a second polarization control unit, and wherein the first and the second polarization control units set an angle of approximately 45 degrees between a first plane of polarization of the output light and a second plane of polarization of the control light.

10. The apparatus according to claim 9, wherein a transmission axis of the polarizer makes an angle of 90 degrees with the plane of polarization of the output light.

* * * * *

UNITED STATES PATENT AND TRADEMARK OFFICE
CERTIFICATE OF CORRECTION

| | | |
|---|---|---|
| PATENT NO. | : 7,397,975 B2 | Page 1 of 1 |
| APPLICATION NO. | : 11/627423 | |
| DATED | : July 22, 2008 | |
| INVENTOR(S) | : Ryou Okabe et al. | |

It is certified that error appears in the above-identified patent and that said Letters Patent is hereby corrected as shown below:

Column 8, Line 2, Claim 1 change "optical switch," to --apparatus--.

Column 8, Line 3, Claim 1 after "unit" delete "for".

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,397,975 B2 Page 1 of 1
APPLICATION NO. : 11/627423
DATED : July 8, 2008
INVENTOR(S) : Ryou Okabe et al.

It is certified that error appears in the above-identified patent and that said Letters Patent is hereby corrected as shown below:

Column 8, Line 2, Claim 1 change "optical switch," to --apparatus--.

Column 8, Line 3, Claim 1 after "unit" delete "for".

This certificate supersedes the Certificate of Correction issued November 4, 2008.

Signed and Sealed this

Twenty-fifth Day of November, 2008

JON W. DUDAS
*Director of the United States Patent and Trademark Office*